United States Patent Office 3,380,802
Patented Apr. 30, 1968

3,380,802
CARBONATIZING ROAST OF LITHIUM-BEARING ORES
Maurice Archambault, Quebec, Quebec, and Charles A. Olivier, Ste.-Foy, Quebec, Canada, assignors to Ministere des Richesses Naturelles, Quebec, Quebec, Canada
No Drawing. Filed Sept. 18, 1964, Ser. No. 397,615
Claims priority, application Great Britain, Sept. 30, 1963, 38,418/63
10 Claims. (Cl. 23—63)

The invention relates to the recovery of lithium and other values from calcined lithium-bearing silicates.

It is well known that lithium generally co-exists, in the natural mineral form, with silicon, aluminum, sodium, iron, manganese, fluorine, and possibly other elements, the proportion of one element to the other varying over a wide range in different ore deposits. Due to their chemical complexity and refractoriness, the metallurgical treatment of the lithium minerals has been difficult and expensive, their decomposition resulting, for instance, in the formation of a number of heterogeneous and complex products hard to separate and from which a directly marketable and widely used lithium compound could not be obtained.

The present invention provides a direct and economic pyrometallurgical process for treating lithium alumino-silicate minerals to recover essentially all of the lithium, in a product which commands the highest market demand, i.e. the carbonate.

The applicants have now found that it is possible to effect on calcined lithium aluminosilicate minerals a carbonatizing roast whereby said minerals are directly converted to lithium carbonate and a substantially lithium free residue readily separable by known means. The applicants' carbonatizing roast, comprises, a pyrometallurgical treatment wherein the lithium-bearing minerals are reacted in a solid-to-solid reaction with sodium carbonate in intimate admixture, and in the absence of other reactants, under such conditions and to such a temperature (below that of fusion of the reactants or reaction products) that said minerals are chemically changed to a powdery (unmolten) mixture of only a few simple products, i.e. lithium carbonate and anhydrous sodium aluminosilicate (one or more). This mixture can then be further treated towards separating the lithium values. For example, it can be leached to dissolve lithium carbonate from said roasted products, or it can be subjected to hydrothermal treatment to further decompose said roasted products and then leached.

More specifically, according to the invention, the calcined lithium-bearing aluminosilicate, for example, β-spodumene (decrepitated spodumene) is heated in the dry state with sodium carbonate as the sole reactant in an amount of at least about 1 mole per mole of lithium oxide present in the starting silicate, at a temperature of at least about 450° C. and below about 750° C. and preferably from about 525° C. to about 675° C. The applicants have found that by this procedure at least a major part of the lithium may be converted to readily separable crystalline lithium carbonate, without the formation of complex sodium-lithium aluminosilicates. This can be accomplished in a matter of about ten minutes to about two hours, depending on the specific temperature employed, the amount of reactant, and the degree and nature of agitation of the charge.

Generally, the applicants prefer to carry out this carbonatizing roast reaction in the presence of a small amount of at least one promoter substance selected from the group consisting of gaseous carbon dioxide, alkali metal chlorides and alkali metal sulphates. Among the alkali metals, sodium and potassium are preferred. The promoter substance is preferably used in amounts from about 1 to about 5% of the dry weight of the calcined lithium aluminosilicate. Larger amounts could be used, but without significant improvements. Too great an excess may reduce the reactive effect of sodium carbonate.

In the carbonatizing roast treatment, the promoter is not consumed or changed by the reaction but merely acts as a catalyst. The charge subjected to roasting is also free from reacting substances other than sodium carbonate, for instance, sodium nitrate, sodium acetate, sodium formate, sodium hydroxide, calcium hydroxide, calcium chloride, carbonate or sulphate, etc., which would not assist the applicants' process but would merely result in complex and heterogeneous reaction products difficult to separate and purify.

Alkali metal chlorides and/or sulphates when used as promoters in the applicants' preferred roasting step favor a high lithium extraction yield at a comparatively low temperature. Should excessive roasting temperatures be employed, side reactions would occur which form lithium compounds that are difficult to leach except with strong mineral acids. In fact, the applicants have found that such undesirable reactions may be avoided or at least restricted to a comfortable minimum particularly in the lower part of the temperature range, whereby a substitution reaction takes place in which the lithium extracted from the silicate molecule is replaced by sodium, giving as a reaction product an anhydrous sodium aluminosilicate in which the ratio of the alumina to the silica content is substantially the same as that of the original silicate. For example, when β-spodumene $$(Li_2O.Al_2O_3.4SiO_2)$$

is roasted with $Na_2CO_3$ at low temperature, the anhydrous sodium aluminosilicate produced corresponds to $Na_2O.Al_2O_3.4SiO_2$, while the lithium displaced is obtained in the form of $Li_2CO_3$.

However, in the upper part of the temperature range, while the reaction is probably initiated in the same manner, it seems that the carbonate or carbonates present (either $Na_2CO_3$, $Li_2CO_3$ or both) react afterwards with the $Na_2O.Al_2O_3.4SiO_2$ formed at the start to effect its transformation to ($Na_2O.Al_2O_3.2SiO_2$) with accompanying formation of a lithium silicate or a complex sodium-lithium aluminosilicate. The applicants have now found that the sodium aluminosilicates should have $SiO_2$ to $Al_2O_3$ and $SiO_2$ to $Na_2O$ ratios within the range of about 4:1 to 2:1, which ratios signify that no substantial amount of undesirable by-products have been formed. Certain of the applicants' preferred procedures make it possible to avoid or restrict to an acceptable minimum the formation of $Na_2O.Al_2O_3.2SiO_2$, together with that of lithium silicate and sodium-lithium aluminosilicate. The applicants have found that lithium silicates, especially when formed at high temperatures are most difficult to leach whereas the sodium-lithium aluminosilicates are still worse and the prior art has had to use sulphuric acid to get the lithium out as an impure sulphate contaminated with sodium, aluminum, silicon, and other elements.

A feature of the invention, then, is the novel application of a carbonatizing roast to lithium-bearing mineral materials containing significant quantities of aluminum, silicon, sodium, iron, manganese, and other elements to achieve an easy and substantially complete separation of lithium values either as a carbonate of high purity or as a directly derived compound from the latter.

The invention also contemplates a procedure that avoids or at least restricts to very small amounts the formation of difficultly leachable lithium compounds (silicates) by carrying out the reaction "in the continuous presence" of carbon dioxide at atmospheric or supra atmospheric pressure, at the site of the reaction. By continuous presence of carbon dioxide, it is meant that substantially at all times a partial pressure of this gas is maintained at the site of reaction. This is accomplished for instance by circulating carbon dioxide gas in the reactor or by operating under low pressure (of say 30 p.s.i. or less) of carbon dioxide. The purpose of the constant presence of gaseous $CO_2$ is to prevent the formation of lithium silicates through reaction between sodium or lithium carbonates with the silica of the aluminosilicate or with the silica freed therefrom, thereby maintaining in the solid state the solid $CO_2$ of the carbonates, said state being the most effective for producing the lithium salt sought for, i.e. the carbonate. In this way, while the formation of $Na_2O.Al_2O_3.2SiO_2$ and free silica may still occur, substantially all the lithium is obtained in the form of the purer and more easily leachable lithium carbonate, and the higher roasting temperatures thus permissible increase the lithium yield without decreasing the quality of the lithium product. As a promoter, carbon dioxide may be used alone or with alkali metal chlorides or sulphates or both.

Another preferred aspect of the invention is that the roasting reaction of the lithium-bearing silicates with sodium carbonate may be linked with the necessary calcination to which these minerals have to be subjected before being subjected to extractive treatments. Indeed, suitable calcination requires temperatures of which the minima vary according to the minerals and range from above about 1080° C. for petalite to above about 850° C. for lepidolite while the temperature required to modify the eucryptite is above about 980° C. and that of spodumene above about 870° C. To apply the carbonatizing roast of the present invention, therefore, no special heating is required it is merely necessary to cool the calcined mineral to a temperature advantageous for efficient roasting and to admix it with sodium carbonate in a finely divided form. The applicants suggest effecting this reaction in rotary kilns or multi-hearth furnaces working, in effect in the applicants' procedure, as coolers or heat exchangers. These reactors would present the advantage, among others, of maintaining the reacting charge in continuous movement, and of lending themselves to easy control.

In a preferred process, according to the invention, and as mentioned previously, the mixture of products resulting from the roasting decomposition reaction (lithium carbonate, anhydrous aluminosilicate and incidentally some undesirable side products, e.g. sodium-lithium aluminosilicates) can, under certain circumstances, be subjected to a hydrothermal treatment for transforming the above-mentioned sodium aluminosilicates and undesirable products into sodic zeolites, thereby increasing the extraction yield and facilitating the obtention of purer lithium compounds. The zeolites obtainable are of two types, one isometric and having a chemical formula approximating $Na_2O.Al_2O_3.4SiO_2.xH_2O$, and the other anisometric and having a composition approximating $$Na_2O.Al_2O_3.2SiO_2.yH_2O$$

In these formulae $x$ and $y$ represent the amount of water which varies. Usually, $x$ or $y$ will equal about 2.

The hydrothermal decomposition treatment involves digesting the roasting products mixture with sodium carbonate either added or as a residue from an excess used in the roasting decomposition reaction. The sodium carbonate is preferably present in an amount from about 1 mole to about 3 moles per mole of lithium oxide present in the charge, with water in an amount effective to act as a carrier, for example, between about 1 and about 4 times the weight of the charge submitted to the hydrothermal digestion. At a preferred temperature from about 90° C. to about 225° C., the hydrothermal digestion may be substantially completed within about a fraction of a minute to about fifty hours. To put it otherwise, the hydrothermal treatment is carried out to the point where substantially all the lithium is converted to lithium carbonate or silicated lithium carbonate in admixture with sodic zeolites.

The hydrothermal treatment is related to that which would be employed if the calcined lithium-bearing silicates were directly treated hydroethermally as disclosed in United States Patent 3,112,171, November 26, 1963, Maurice Archambault, and in co-pending United States application, Serial Number 287,766 filed June 14, 1963, now Patent No. 3,310,368, Maurice Archambault, but it would require a shorter time or lower temperature or smaller $Na_2CO_3$ amount for equivalent lithium extraction or zeolite production.

The patent details the hydrothermal formation of either isometric or anisometric zeolite at relatively high temperatures while the application discloses a process whereby the treatment is preferably effected at low temperatures to produce a special anisometric zeolite having considerably enhanced ion exchanging properties.

The components of the decomposition mixture, whether the carbonatizing roast reaction has been followed by a hydrothermal digestion or not, can be readily separated by known means, for example, (a) leaching with cold water and more particularly as disclosed in United States Patent 3,112,172, November 26, 1963, Archambault et al.; (b) leaching with aqueous carbon dioxide, as disclosed in the United States Patent 3,112,171, November 26, 1963, Maurice Archambault; (c) leaching with aqueous ammonium salts of carbonic acid, e.g. ammonium bicarbonate, as detailed in United States Patent 3,131,022, April 28, 1964, Maurice Archambault, in United States Patent 3,112,170, November 26, 1963, Archambault et al., and co-pending United States patent application Serial Number 287,766, filed June 14, 1963, now Patent No. 3,310,368 Maurice Archambault.

The separation of the lithium values may also be done in other different ways known in the art. The best mode of separating generally depends on the decomposition treatment to which the lithium-bearing minerals have been subjected. In cases (b) and (c) leaching may be performed at room temperature and the amount of water should be such that the concentration of $Li_2O$ in the liquor be preferably from 10 grams to 20 grams per liter.

Leaching, according to (a), (b) and (c) above, gives a solution of lithium carbonate. When other lithium compounds are sought for, the applicants may employ a selected leaching reactant to form the desired soluble lithium compounds, directly from the dewatered decomposition products mixture, without decomposing the lithium-free residual solids. For example, they may use (d) water containing alkaline earth compounds, which are more soluble than the corresponding carbonate, e.g. calcium hydroxide, calcium chloride, magnesium sulphate, etc., whereby lithium hydroxide, chloride and sulphate are obtained in solution, respectively; (e) weak acids strong enough to decompose the lithium carbonate of the decomposition mixture, without decomposing the other components of the latter, such acids being those whose dissociation constants at 25° C. range from about 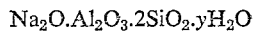 $1\times10^{-3}$ to $5\times10^{-7}$ and whose corresponding lithium salts are at least as soluble as lithium carbonate, e.g. acetic, citric, lactic, salicylic, tartaric acids, etc. Leachings, according to (d) and (e), are conducted in a known manner, as described at length in co-pending United States patent application, Serial Number 301,230, filed July 25, 1963, now Patent No. 3,343,910 Archambault et al. Patents referred to in (a), (b) and (c) and co-pending application mentioned for leachings (d) and (e) are all assigned to Ministere des Richesses Naturelles, Province de Quebec, Canada.

While leachings (b) and (c) apply very well to any of the decomposition mixtures that can be produced in the present invention, leachings (a), (d) and (e) are generally satisfactory only when substantially all the lithium salt produced is the carbonate and when all the sodium aluminosilicate by-products formed are substantially either 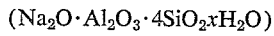 $(Na_2O \cdot Al_2O_3 \cdot 4SiO_2)$ or $$(Na_2O \cdot Al_2O_3 \cdot 4SiO_2 xH_2O)$$

Leaching (c) is especially advantageous when the sodium aluminosilicate of the decomposition mixture is an anisometric sodic zeolite approximating

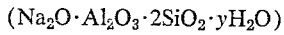 $$(Na_2O \cdot Al_2O_3 \cdot 2SiO_2 \cdot yH_2O)$$

since the latter has excellent ion-exchanging properties and is amenable to sodium regeneration.

Supposing that the components of the decomposition mixture are constituted of:

| | |
|---|---|
| $Li_2CO_3$ | 37 |
| $Li_2O.2SiO_2$ | 75 |
| Anisometric sodic zeolite | 320 |
| $SiO_2$ | 60 | which is a mixture liable to form, but is nearly impossible to leach with water alone or with diluted mineral acids without producing very impure lithium solution, the various functions of the ammonium salts of carbonic acid or rather of various additions to water of $NH_3$ and $CO_2$ gases can be exemplified in the very simplified manner as follows:

Theoretical Equation 1

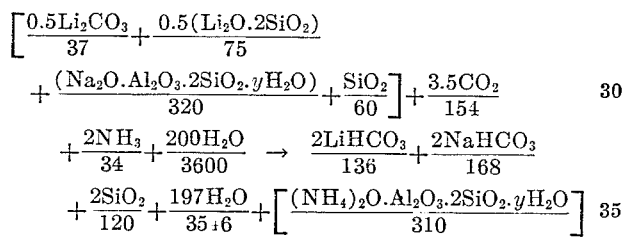

$$\left[\frac{0.5Li_2CO_3}{37} + \frac{0.5(Li_2O.2SiO_2)}{75}\right.$$
$$+ \frac{(Na_2O.Al_2O_3.2SiO_2.yH_2O)}{320} + \frac{SiO_2}{60}\right] + \frac{3.5CO_2}{154}$$
$$+ \frac{2NH_3}{34} + \frac{200H_2O}{3600} \rightarrow \frac{2LiHCO_3}{136} + \frac{2NaHCO_3}{168}$$
$$+ \frac{2SiO_2}{120} + \frac{197H_2O}{3546} + \left[\frac{(NH_4)_2O.Al_2O_3.2SiO_2.yH_2O}{310}\right]$$

Theoretically all the lithium of said decomposition mixture is obtained in a pure solution form, whereas all the sodium spent in the decomposing treatment is regenerated and solubilized, while also the sodium zeolite is converted to an ammoniated zeolite offering, as such, good marketing possibilities, inter alia, in horticulture as a delayed action fertilizer. When desired, the ammonium of the ammoniated zeolite can be recovered easily by heating and returned to the leaching step in a complete cyclic process.

If aqueous carbon dioxide had been used without ammonia, lithium leaching would have been very good, but no sodium regeneration would have been accomplished.

Theoretical Equation 2

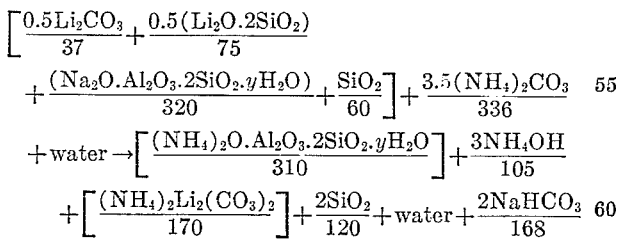

$$\left[\frac{0.5Li_2CO_3}{37} + \frac{0.5(Li_2O.2SiO_2)}{75}\right.$$
$$+ \frac{(Na_2O.Al_2O_3.2SiO_2.yH_2O)}{320} + \frac{SiO_2}{60}\right] + \frac{3.5(NH_4)_2CO_3}{336}$$
$$+ water \rightarrow \left[\frac{(NH_4)_2O.Al_2O_3.2SiO_2.yH_2O}{310}\right] + \frac{3NH_4OH}{105}$$
$$+ \left[\frac{(NH_4)_2Li_2(CO_3)_2}{170}\right] + \frac{2SiO_2}{120} + water + \frac{2NaHCO_3}{168}$$

The isomorphous lithium-ammonium carbonate theoretically formulated in Equation 2 is readily soluble in water, giving in presence of $NH_4OH$ a solution especially free from impurities.

The applicants also contemplate using so-called aqueous ammonium salts of carbonic acid where $CO_2$ and ammonia are in molecular ratios from about 1:2 to about 2:1 as lixiviants in one of their separation procedures. This procedure is especially useful where the decomposition mixture contains undesirable side-reaction products. A proportion of 2 moles of $CO_2$ for 1 mole of $NH_3$ permits generally a higher lithium solubility in water.

Either to save on lixiviant costs, or to operate under the optimum conditions for any situation or any decomposition mixture that may present itself or for all these reasons, the applicants have found advantageous to adjust the pH or the reactivity of the lixiviant more closely by using either $CO_2$ alone or $CO_2$ in the presence of $NH_3$ in any proportions below 2 moles of $NH_3$ to 1 mole of $CO_2$, i.e. the amount of $NH_3$ in the aqueous carbon dioxide may vary from zero to not more than about 2 moles of $NH_3$ per mole of $CO_2$.

In the applicants' carbonatizing roast neither the reactant, sodium carbonate, nor the reaction products, lithium carbonate and sodium aluminosilicates, are melted or sintered during the reaction, as in the case of certain prior art alkaline processes, some of which depend on the melting of the reactant in order to be operable. It is also unexpected that sodium carbonate alone could be used as the sole reactant in a pyrometallurgical process, since one would normally expect a heterogeneous reaction product containing sodium aluminate, lithium aluminate, sodium silicate, lithium silicate, etc. and all kinds of combinations therefrom which later on make the leach solution impure and difficult to separate. In fact, in the standard analytical methods of decomposing ores, sodium carbonate is employed, especially in the case of refractory ores, so as to decompose the ores completely into a number of different heterogeneous fractions, so that nearly all the constituents decomposed in this way are leachable with water. In order to make plant production out of such a conglomeration would virtually make a glorified assay process. With the inherent and numerous separation and purification process steps required, this would be extremely costly. It is not surprising then that the art has been silent on the use of sodium carbonate as a potential reactant in a pyrometallurgical process for the direct production of lithium carbonate directly of commercial purity, and that rather processes leading in other directions have been suggested.

The present carbonatizing roast process makes it possible to shorten the time taken from the commencement of the initial decomposition of the calcined lithium-bearing silicates to the time of recovery of the crystalline lithium carbonate and the zeolitic sister material, as compared, for example, with previously more direct known processes in which the lithium-bearing silicate was hydrothermally decomposed in the presence of sodium carbonate. The economics of the sodium carbonate hydrothermal process of the prior art are thus improved, at least when the present invention is applied to a large scale or integrated plant operation, since particularly the carbonatizing roast treatment is accomplished with heat which would otherwise be lost. This is also true where a hydrothermal treatment follows, since this may be effected at lower temperature, in a shorter time and with less expensive equipment than if the entire decomposition is effected by hydrothermal means.

In order to provide a better understanding of this invention, reference will be made to the following specific examples which illustrate preferred embodiments of the process. All parts mentioned in the examples are by weight.

EXAMPLE 1

A batch of 1000 parts of a comminuted spodumene concentrate assaying 5.8% $Li_2O$ were calcined in a rotary kiln at a temperature of about 1000° C., to effect its transformation from the $\alpha$ to the $\beta$ form. The calcined mineral was then run into another rotary kiln and cooled therein to such a temperature that when 410 parts of $Na_2CO_3$ were added as a decomposing reactant, the resulting mixture was at a roasting temperature of about 650° C. A reaction between the mineral and the reactant set in immediately and from that time the cooling was effected at such a rate that after thirty minutes of reaction the agitated charge in the rotary kiln had reached about 550° C. The product was then discharged into a vat equipped with agitating means and containing 4000 parts of cold water so as to form a slurry. The slurry agitated in the vat at room temperature. Carbon dioxide gas was introduced through the bottom of the vat and bubbled into the slurry to saturate its water content and dissolve the lithium carbonate.

The resulting slurry was then filtered and the liquor heated and agitated to crystallize out lithium carbonate. The crystalline lithium carbonate thus recovered represented about 75% of the lithium content of the starting spodumene, the remainder of the lithium content having stayed in the solid residue. The residue was composed mostly of anhydrous sodium aluminosilicate of the following composition $Na_2O \cdot Al_2O_3 \cdot 4SiO_2$. Using larger amounts of $Na_2CO_3$ improved the lithium recoveries, according to tests conducted under conditions otherwise similar.

EXAMPLE 2

The procedure of Example 1 was followed, but after the thirty minutes roasting treatment between 650° C. and 550° C., the mixture was slurried with 2500 parts of water and agitated in a covered vessel at a temperature in the range from 100° C. to 105° C., i.e. boiling for a period of forty hours. The resulting slurry was then cooled to room temperature and diluted with 1500 parts of water, then 1000 parts of ammonium bicarbonate were added and the mixture was agitated for thirty minutes and filtered to provide a liquor which contained over 90% of the lithium content of the starting mineral as dissolved lithium carbonate. This liquor was heated to precipitate lithium carbonate and regenerate most of the ammonium salt. The analysis of the insoluble residue has shown that over 85% of the sodium of the anisometric sodic zeolite formed by the hydrothermal decomposing treatment was recovered in the form of sodium carbonate in solution. Lower amounts of ammonium salts of carbonic acid gave approximately the same lithium and sodium yields. Here, the substantially lithium-free solid residue was an ammoniated anisometric zeolite having enhanced ion exchanging properties and useful as a delayed action nitrogenous fertilizer.

EXAMPLE 3

The procedure of Example 2 was followed except that the hydrothermal treatment was conducted at 140° C. under pressure and for one hour. After leaching under identical conditions approximately the same lithium carbonate yields were obtained.

EXAMPLE 4

Same procedure as in Example 2 but the hydrothermal treatment was carried out under pressure at 170° C. for thirty minutes. The cooled slurry from the pressure vessel was diluted in a vat to make a total amount of water of 4500 parts and carbon dioxide gas was bubbled through the resulting slurry to saturation. The separated liquor was found to contain 97% of the lithium contained in the starting silicate. Lithium carbonate was recovered from the liquor through heating and agitating. The solid residue left after leaching was mostly isometric sodium zeolite.

EXAMPLE 5

This example was conducted as the Example 1 with an amount of sodium carbonate of 310 parts mixed with 25 parts of fine sodium chloride. The products of the roasting treatment were discharged in a vat containing 4000 parts of cold water and carbon dioxide gas was bubbled through the slurry to saturation. The filtered liquor contained 87% of the lithium of the starting mineral and could be recovered through heating and agitating of the liquor. The solid residue was essentially composed of a mixture of two anhydrous sodium aluminosilicates, namely $$Na_2O.Al_2O_3.4SiO_2 \text{ and } Na_2O.Al_2O_3.2SiO_2$$

Larger amounts of $Na_2CO_3$ improved the lithium extraction, according to tests conducted under operating conditions otherwise similar.

EXAMPLE 6

The procedure of Example 5 was followed but using in addition 14 parts of a mixture of equal amounts of sodium chloride and potassium chloride. The results were approximately identical.

EXAMPLE 7

The procedure of Example 5 was followed but the roasting step was effected "in continuous presence of carbon dioxide gas." The recovery of the lithium based on the lithium content of the original spodumene concentrate was 92.5%.

EXAMPLE 8

This example is similar to Example 6 with the roasting treatment conducted "in continuous presence of carbon dioxide gas." The extracted lithium from the original mineral reached 93.5%.

EXAMPLE 9

The procedure of Example 5 was followed but the promoter was a mixture of 25 parts of $Na_2SO_4$ and 25 parts of NaCl and the roasting was done "in the continuous presence of carbon dioxide gas." The recovery of lithium was 93.5%.

EXAMPLES 10 TO 13

The following examples appear under the form of a table. These examples show the effect of roasting for thirty minutes at different temperatures on a mixture of 1000 parts of spodumene (containing 5.8% of lithium oxide), 310 parts of sodium carbonate and 50 parts of promoter (mixture of NaCl and KCl in approximately equal amounts by weight). The resulting roasted mixtures were leached with 4000 parts of water saturated with carbon dioxide. The recovery was calculated from the insoluble lithium content of the dry leached residues.

TABLE G

| Example No. | Test No. | Temp., ° C., | Lithium Recovery, Percent |
| --- | --- | --- | --- |
| 10 | A | 500 | 78.3 |
| 11 | B | 550 | 87.3 |
| 12 | C | 575 | 91.9 |
| 13 | D | 650 | 92.4 |

This table shows that the recovery increases with temperature but it was found experimentally that the lithium is more easily leached when the roasting is done for example at 575° C. than at 650° C. due to the formation at the latter temperature of larger amounts of $$Na_2O.Al_2O_3.2SiO_2$$

It should be pointed out that the leaching would be easier and the recovery still higher if the roasting had been done in presence of carbon dioxide gas. It should be understood that these results are only valid for the amounts and conditions the particular examples referred to in the table.

EXAMPLE 14

A batch of 1000 parts of β-spodumene concentrate containing 5.8% of lithium oxide was intimately mixed with 610 parts of sodium carbonate and 40 parts of sodium chloride. The mixture was roasted at 600° C. for thirty minutes in a rotary kiln. The product was then slurried in a vat equipped for agitation with 4000 parts of water and carbon dioxide bubbled through. The slurry was filtered and by analyzing the dry separated residue it was found that 90% of the lithium content of the spodumene was extracted. The lithium carbonate produced in any of the above examples was at least of a 98% purity, such a purity being obtained directly, i.e. without any purification step.

Spodumene has been exemplified since it is the most usual and readily available source of lithium. Similar results are obtainable with calcined lepidolite, petalite and eucryptite, which behave essentially like β-spodumene, giving similar reaction products to those mentioned above.

EXAMPLE 15

The carbonatizing roast procedure of Example 1 was followed in a general manner, i.e. the decomposition roasting was effected while cooling the calcined β-spodumene from about 1000° C. (its calcining temperature) to below about 750° C., mixing the partially cooled product with 615 parts of sodium carbonate rapidly cooling thereby the mixture to about 650° C. at which temperature a solid-to-solid reaction took place and was completed when the reacting charge had reached about 550° C., i.e. after thirty minutes. The product of this carbonatizing roast was then cooled further with the hydrothermal treatment, whereby the roasting mixture was slurried with 3700 parts of water and kept agitated at a temperature in the range from 100° C. to about 105° C. for a period of forty hours. The resulting slurry was then cooled to room temperature and diluted with 1100 parts of water to which 1000 parts of ammonium bicarbonate were added. This new mixture was agitated for a few minutes and filtered, whereby a filtrate was obtained which contains 95% of the lithium content of the starting mineral as dissolved lithium carbonate. The lithium-bearing solution was heated to evolve ammonia and carbon dioxide gases thereby precipitating lithium carbonate. The analysis of the insoluble residue has shown that over 97% of the sodium content of the anisometric sodic zeolite formed by the hydrothermal treatment was recovered in the form of sodium carbonate solution, while the ammoniated zeolite produced at the leaching step was left as a by-product.

Whereas the invention has been described with respect to certain preferred procedures, it should be understood that various changes may be made without departing from the essential inventive concepts disclosed and claimed.

We claim:

1. A method for transforming a calcined lithium-bearing aluminosilicate to a state where lithium values are readily recoverable comprising roasting in a solid-solid reaction an intimate mixture of said aluminosilicate and sodium carbonate thereby forming lithium carbonate, the sodium carbonate being present in an amount from about 1 to about 3 moles per mole of lithium oxide contained in the calcined lithium-bearing aluminosilicate, and the roasting temperature ranging from about 450° C. to about 750° C.

2. A method as defined in claim 1, wherein the roasting takes place in the presence of at least one promoter selected from the group consisting of gaseous carbon dioxide, an alkali metal chloride and an alkali metal sulphate, said promoter being present in an amount from about 1% to about 5% by weight of the calcined lithium-bearing aluminosilicate.

3. A method as defined in claim 1, wherein the roasting reaction takes place in the presence of gaseous carbon dioxide at a pressure of at least about one atmosphere.

4. A method as defined in claim 1, in which the lithium-bearing aluminosilicate is a mineral selected from the group consisting of spodumene, petalite, eucryptite and lepidolite calcined to effect its transformation from its naturally occurring form to its calcined form.

5. A method as defined in claim 1, further comprising extracting the lithium values from the roasted mixture by leaching with cold water containing carbon dioxide.

6. A method as defined in claim 1, further comprising extracting the lithium values from the roasted mixture by leaching with cold water containing carbon dioxide and ammonia, the ammonia being present in an amount below about 2 moles of ammonia per mole of carbon dioxide.

7. A method as defined in claim 1, wherein the roasted mixture is further subjected to a hydrothermal treatment comprising heating the roasted mixture at a temperature from about 90° C. to about 225° C. with water in an amount 1 to 4 times the weight of the roasted mixture, in the presence of sodium carbonate in an amount ranging from the stoichiometric amount to about three times the stoichiometric amount.

8. A method as defined in claim 7, further comprising extracting the lithium values from the hydrothermally treated roasted mixture by leaching with cold water containing carbon dioxide.

9. A method as defined in claim 7, further comprising extracting the lithium values from the hydrothermally treated roasted mixture by leaching with cold water containing carbon dioxide and ammonia, the amount of ammonia being below about 2 moles of ammonia per mole of carbon dioxide.

10. A process for recovering lithium values from a lithium-bearing aluminosilicate comprising calcining the lithium-bearing aluminosilicate to effect its transformation from its naturally occurring form to its calcined form, cooling the calcined aluminosilicate to above about 450° C. but below about 750° C., adding to said calcined aluminosilicate sodium carbonate in such an amount that the sodium carbonate is present in an amount from about 1 to about 3 moles per mole of lithium oxide contained in said calcined aluminosilicate, roasting the mixture of said calcined aluminosilicate and sodium carbonate at a temperature of about 450°–750° C. thereby forming lithium carbonate, bringing the roasted product in contact with water in an amount from about 1 to about 4 times the weight of the roasted product at a temperature ranging from about 90° C. to about 225° C. to substantially complete the reaction between the roasted product and the sodium carbonate hydrothermally.

References Cited

UNITED STATES PATENTS

| | | | |
|---|---|---|---|
| 1,131,503 | 3/1915 | Gans | 23—111 |
| 1,710,556 | 4/1929 | Girsewald | 23—27 |
| 2,793,934 | 5/1957 | Cunningham | 23—33 |
| 2,801,153 | 7/1957 | Dwyer | 23—33 X |
| 3,112,170 | 11/1963 | Archambault et al. | 23—33 |
| 3,112,171 | 11/1963 | Archambault | 23—63 |
| 3,112,172 | 11/1963 | Archambault et al. | 23—63 |
| 3,131,022 | 4/1964 | Archambault | 23—63 |
| 3,310,368 | 3/1967 | Archambault | 23—63 |

FOREIGN PATENTS 27,126    1909    Great Britain.

OSCAR R. VERTIZ, *Primary Examiner.*

G. T. OZAKI, *Assistant Examiner.*